(12) United States Patent
North et al.

(10) Patent No.: US 10,146,278 B2
(45) Date of Patent: Dec. 4, 2018

(54) THERMAL SPREADER SPANNING TWO (OR MORE) HOUSINGS

(71) Applicant: Dell Products L. P., Round Rock, TX (US)

(72) Inventors: Travis C. North, Cedar Park, TX (US); Christopher A. Torres, San Marcos, TX (US); John Trevor Morrison, Round Rock, TX (US)

(73) Assignee: Dell Products L. P., Round Rock, TX (US)

( * ) Notice: Subject to any disclaimer, the term of this patent is extended or adjusted under 35 U.S.C. 154(b) by 0 days.

(21) Appl. No.: 15/476,400

(22) Filed: Mar. 31, 2017

(65) Prior Publication Data

US 2018/0284855 A1    Oct. 4, 2018

(51) Int. Cl.
| | |
|---|---|
| *G06F 1/16* | (2006.01) |
| *H05K 7/00* | (2006.01) |
| *H05K 5/00* | (2006.01) |
| *G06F 1/20* | (2006.01) |

(52) U.S. Cl.
CPC ............ *G06F 1/203* (2013.01); *G06F 1/1616* (2013.01)

(58) Field of Classification Search
CPC . G06F 1/20; G06F 1/203; G06F 1/206; G06F 1/1616; H05K 7/2029; H05K 7/20309; H05K 7/20327; H05K 7/20381; H05K 7/20336; H05K 7/20318

USPC ............. 361/679.26, 679.2, 679.46, 679.47, 361/679.52–679.547, 679.27; 165/104.33, 165/80.1–80.5

See application file for complete search history.

(56) References Cited

U.S. PATENT DOCUMENTS

| | | | |
|---|---|---|---|
| 2005/0111183 A1* | 5/2005 | Pokharna | G06F 1/203 361/679.48 |
| 2014/0101576 A1* | 4/2014 | Kwak | G06F 3/0482 715/761 |
| 2017/0063102 A1* | 3/2017 | Sultenfuss | H02J 5/005 |

* cited by examiner

*Primary Examiner* — Anthony Haughton
(74) *Attorney, Agent, or Firm* — Campbell Stephenson LLP; Shiv S. Naimpally

(57) ABSTRACT

In some examples, a computing device may include a first housing coupled to a second housing by one or more hinges. The first housing may include a first set of components and a heat sink in contact with at least one component of the first set of components. The second housing may include a second set of components. The first set of components may generate more heat than the first set of components. A thermal spreader may include a first portion located in the first housing and a second portion located in the second housing. The first portion may be thermally coupled to the second portion. The first portion may, through contact with the heat sink, gather heat generated by the at least one component and transfer the heat to the second portion. The second portion may dissipate at least some of the heat.

20 Claims, 8 Drawing Sheets

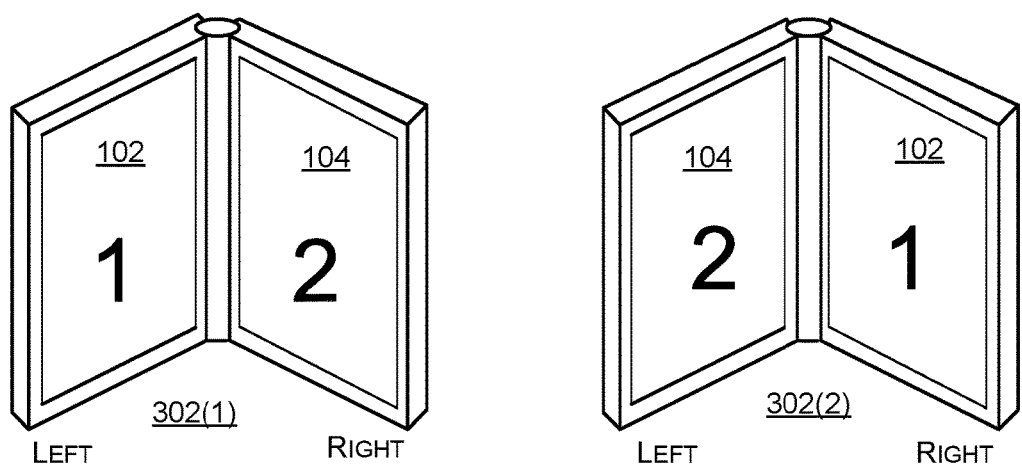
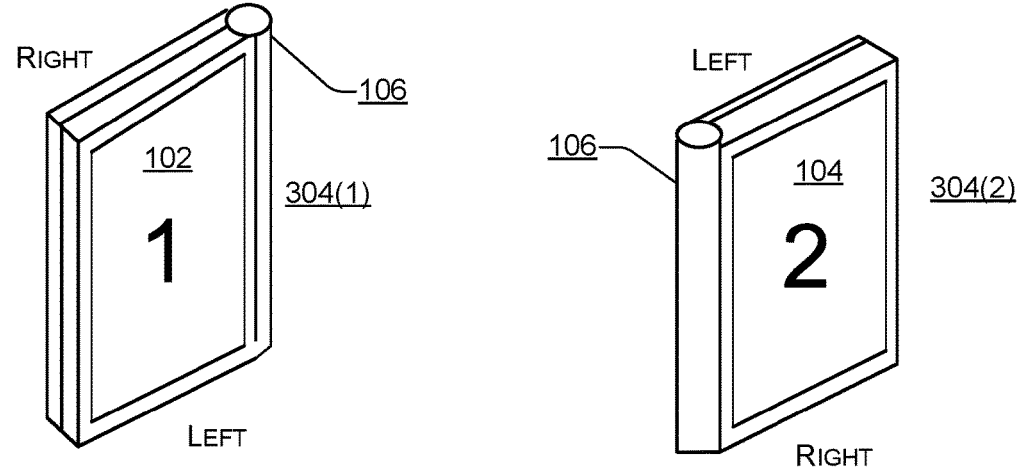
FIG. 3

THERMAL SPREADER SPANNING TWO (OR MORE) HOUSINGS

BACKGROUND OF THE INVENTION

Field of the Invention

This invention relates generally to computing devices having two or more housings and, more particularly, to using a thermal spreader that spans both housings, enabling the thermal spreader to wick away heat from components in a first housing and disperse the heat via a second housing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable computing devices, such as laptops and tablets, may have two (or more) housings. For example, a tablet may have a first housing coupled to a second housing using a hinge that can flex between 0 degrees and 360 degrees, e.g., in a book-style format. Each housing may include a touch screen display device. In such a computing device, the computing components (e.g., those typically found on a motherboard, such as central processing unit (CPU), graphics processing (GPU), memory, and the like) may be located in one housing and the power components (e.g., battery, battery charger, power supply, and the like) may be found in the other housing. As another example, in a conventional laptop, the computing components and power components may be located in one housing and a display device may be located in the other housing. However, arranging the components in such a fashion may cause the housing with the computing components to become significantly warmer in temperature than the housing with the other components, thereby creating a cool side (e.g., housing) and a hot side. Such a temperature differential between two housings may cause a user of the computing device to become concerned and result in the user calling customer service.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include a first housing coupled to a second housing by one or more hinges. The first housing may include a first set of components and a heat sink in contact with at least one component of the first set of components. The second housing may include a second set of components. The first set of components may generate more heat than the first set of components. A thermal spreader may include a first portion located in the first housing and a second portion located in the second housing. The first portion may be thermally coupled to the second portion. The first portion may, through contact with the heat sink, gather heat generated by the at least one component and transfer the heat to the second portion. The second portion may dissipate at least some of the heat.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 3 is a block diagram illustrating different vertical orientations of a dual-housing computing device according to some embodiments.

DETAILED DESCRIPTION

Figure 1:
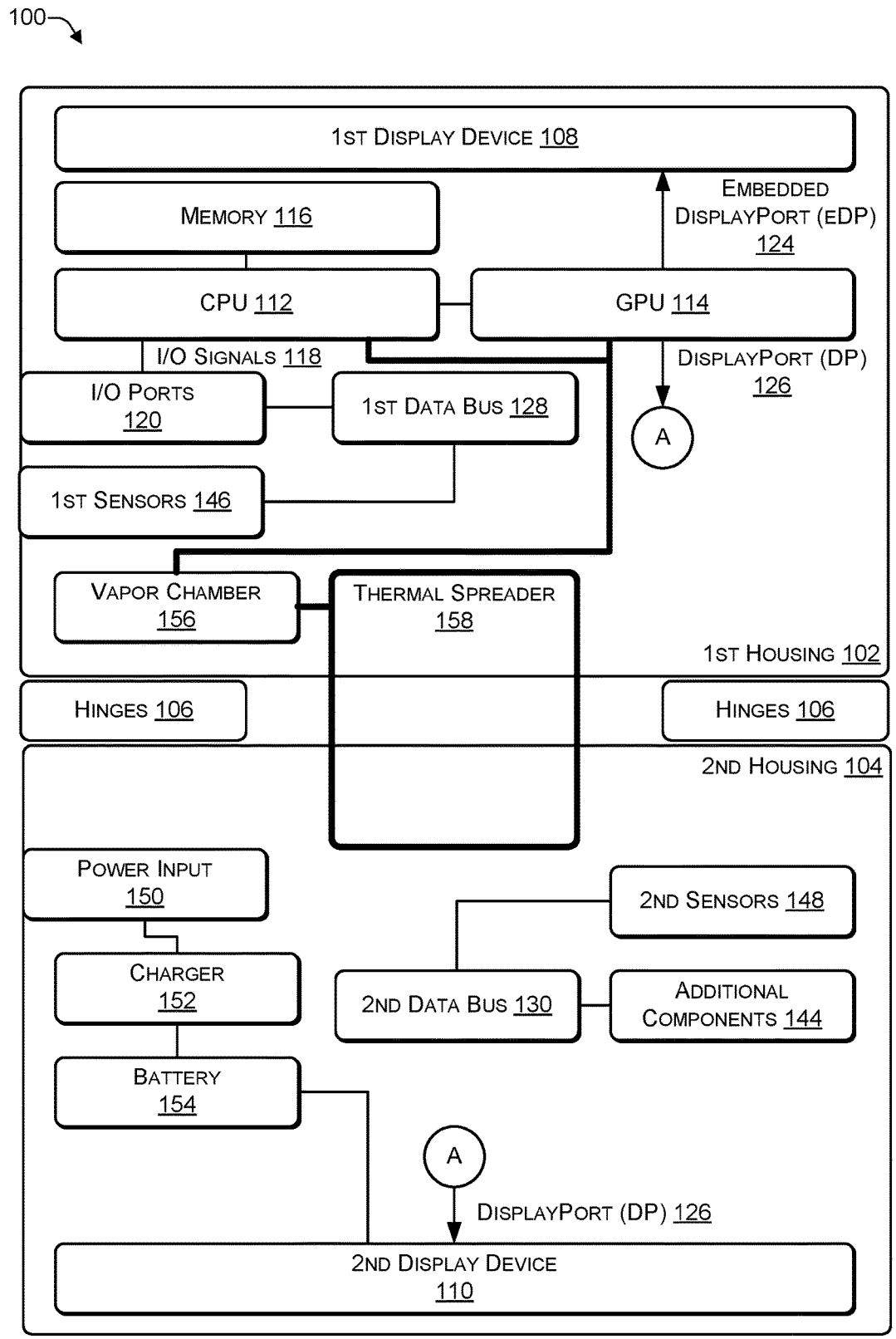
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use a thermal spreader that spans two (or more) housings of a computing device. The computing device may use passive cooling, e.g., a fan may not be used to force air onto components for cooling. The advantage of passive cooling (as compared to using a fan) is that the amount of noise generated may be lower and heated air may not exit the computing device. One of the housings may include computing components, such as those typically found on a motherboard, such as central processing unit (CPU), graphics processing (GPU), memory, and the like. One or more of the computing components may be in contact with a vapor chamber. A vapor chamber is a hollow cylinder (or other sealed shape) that includes a small amount of a liquid in a vacuum. The vapor chamber may be made from a metal (or a metal alloy) such as copper (or a copper alloy). When heat is present at one end of the vapor chamber, the heat may cause the liquid to vaporize. The vaporized liquid may condense back to a liquid at another (e.g., cooler) end of the vapor chamber. A vapor chamber is typically used to cool a CPU. However, in some cases, the vapor chamber may also be used to cool other components of the computing device, such as the GPU, the memory devices, and the like.

The thermal spreader may be in contact with the vapor chamber that is located in a first housing that includes a first set of components (e.g., the computing components, such as CPU, GPU, memory, and the like). The thermal spreader may conduct heat from the first set of components (e.g., via the contact with the vapor chamber) to a second housing where the heat is more easily dissipated because a second set of components housed in the second housing may generate less heat than the first set of components.

The thermal spreader may include one or more layers of thermally conductive materials, such as graphite, copper, aluminum, another type of material, or any combination thereof. The thermal spreader may use at least 3 portions, e.g., a first portion in the first housing, a second portion in the second housing, and a third portion that thermally connects the first portion to the second portion. The third portion of the thermal spreader may be sufficient flexible to enable the first housing to be placed at an angle (e.g., preferably between about 0 to about 180 degrees or between about 0 to about 360 degrees) relative to the second housing. The third portion of the thermal spreader may be capable of thermally conducting heat from a warmer housing to a cooler housing while the first housing is placed at an angle relative to the second housing. In addition, the third portion of the thermal spreader may be designed to be repeatedly flexed (e.g., articulated) without breaking (or other damage) for an expected life of the computing device. In some cases, the third portion of the thermal spreader may be placed inside the one or more hinges that are used to couple the first housing to the second housing of the computing device. For example, by using a thermal spreader made of graphene, a flexible material, a single graphene sheet can be used for both housings by threading the graphene sheet through hollowed out hinges. In some cases, a portion of the graphene sheet may protrude outside the first housing and the second housing. In such cases, the exposed graphene sheet may be protected using a cover made out of leather, plastic, cloth, or other flexible material with insulating properties.

By using a thermal spreader that spans both housings, the temperature difference between the two sides of the computing device may be reduced to less than a pre-determined threshold (e.g., preferably less than 6 degrees Fahrenheit and more preferably less than 4 degrees Fahrenheit). For example, the temperature difference between the two sides of the computing device may be reduced to a level that does not cause users to become concerned. Furthermore, a thermal spreader that spans both housings of a computing device may distribute the thermal load across both sides (e.g., housings), approximately doubling the surface area used for thermal dissipation. By increasing thermal dissipation using a thermal spreader, components that use more power may be used in the design of the computing device. The increased thermal dissipation may enable the computing device to support computational components that consume more power (e.g., thereby generating more heat), such as a CPU with more cores, a CPU with a faster clock speed, a more powerful (e.g., more pipelines, faster clock speed, or the like) GPU, more memory, a faster memory, or any combination thereof.

Thus, a thermal spreader comprised of a single sheet having one or layers may be placed in a first housing, a second housing, and across a gap between the two housings. A cover may be used to protect the portion of the thermal spreader that is exposed (e.g., across the gap between the two housings). The thermal spreader may attach to a vapor chamber that is attached to heat generating components (e.g., CPU, GPU, memory, and the like) in a first housing. The thermal spreader may draw heat from the vapor chamber in the first housing and spread and dissipate the heat at a second housing. The thermal spreader may use a flexible, thermally conductive material, such as graphene to enable the first housing to flex and be placed at different angles relative to the second housing.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 102 coupled to a second housing 104 via one or more hinges 106. The hinges 106 may enable the two housings 102, 104 to be positioned at different angles relative to each other in different orientations (e.g., various vertical orientations and various horizontal orientations). Of course, additional housings may be attached via additional hinges to create a computing device with multiple housings.

A first display device 108 may be located in the first housing 102 and, in some cases, a second display device 110 may be located in the second housing 104. A first portion of the components of the computing device 100 may be located in the first housing 102 (e.g., behind the first display device 108) while a remaining portion of the components of the computing device 100 may be located in the second housing 104 (e.g., behind the second display device 110). For example, as illustrated in FIG. 1, the components located in the first housing 102 may include at least one central processing unit (CPU) 112, a graphics process unit (GPU) 114, and a memory (e.g., computer-readable media) 116. The GPU 114 may be integrated into the CPU 112 or may be a separate device from the GPU 114. In some cases, a computer motherboard that includes the CPU 112, the memory 116, and the like may be located in the first housing 102.

The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 102 and two or more lanes of DisplayPort (DP) output 126 that are sent (e.g., wirelessly or via a cable) to the second display device 110 in the second housing 104.

A first data bus 128 in the first housing 102 and a second data bus 130 in the second housing 104 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 104 may include a remaining portion of the components of the computing device 100. In some cases, the components in the second housing 104 may be located behind the second display device 110. The second housing 104 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 102 with the components of the computing device 100 located in the second housing 104. In other cases, a first wireless transceiver in the first housing 102 and a second wireless transceiver in the second housing 104 may provide wireless communications between (1) the components of the computing device 100 located in the first housing 102 and (2) the components of the computing device 100 located in the second housing 104. The first set of sensors 146 and the second sensors 152 may include one or more of a touchscreen sensor, an accelerometer, a gyroscope, an electronic compass (e-compass), a barometer, a magnetometer, a proximity sensor, a light sensor, an imaging sensor (e.g., a camera), a fingerprint sensor, a global positioning satellite (GPS) sensor, another type of sensor, or any combination thereof.

One or more of the computing components, such as the CPU 112, the GPU 114, or the memory 116, may be in contact with a heat sink, such as, for example, a vapor chamber 156. The vapor chamber 156 is a hollow cylinder, cube, or other sealed shape that includes a small amount of a liquid in a vacuum. The vapor chamber 156 may be made from a metal (or a metal alloy), such as copper (or a copper alloy). When heat is present at one end of the vapor chamber 156, the heat may cause the liquid to vaporize. The vaporized liquid may condense back to a liquid at another (e.g., cooler) end of the vapor chamber 156. The vapor chamber 156 may typically be used to cool the CPU 112 when the GPU 114 is integrated into the CPU 112. The vapor chamber 156 may be located in whichever housing is used to house the primary heat generating components. For example, as illustrated in FIG. 1, the vapor chamber 156 may be housed in the first housing 102 to cool the CPU 112.

A thermal spreader 158 may be in contact with the vapor chamber 156. The thermal spreader 158 may conduct heat from heat generating components (e.g., CPU 112, GPU 114, or memory 116), via contact with the vapor chamber 156, to the second housing 104, where the heat is more easily dissipated because components (e.g., battery 154) housed in the second housing 104 may generate less heat than the components in the first housing 102. Thus, the thermal spreader 158 may span both the first housing 102 and the second housing 104 and may draw heat from components in one housing (e.g., the first housing 102) and dissipate the heat in another housing (e.g., the second housing 104).

The thermal spreader 158 may include one or more layers of thermally conductive materials, such as graphite, copper, aluminum, another type of material, or any combination thereof. The thermal spreader 158 may use at least 3 portions, e.g., a first portion in the first housing 102, a second portion in the second housing 104, and a third portion that thermally connects the first portion to the second portion. The third portion of the thermal spreader 158 may be sufficient flexible to enable the first housing 102 to be placed at an angle (e.g., preferably between about 0 to about 180 degrees or between about 0 to about 360 degrees) relative to the second housing 104. The third portion of the thermal spreader 158 may be capable of thermally conducting heat from the warmer housing (e.g., the first housing 102) to the cooler housing (e.g., the second housing 104) while enabling the first housing 102 to be placed at different angles relative to the second housing 104. In addition, the third portion of the thermal spreader 158 may be designed to be repeatedly flexed (e.g., articulated) without breaking (or other damage) for an expected life of the computing device 100. In some cases, the third portion of the thermal spreader 158 may be placed inside the one or more hinges 106 when the hinges 106 are fairly long and cover more than 50% of the length of the computing device 100. The thermal spreader 158 may be made of a flexible material, such as graphene, enabling a single graphene sheet to be used for both housings 102, 104.

In some cases, when the hinges are fairly long, the thermal spreader 158 may be threaded through hollow hinges 106. In other cases, when the hinges are fairly small, a portion of the thermal spreader 158 may protrude outside the first housing 102 and the second housing 104. In such cases, the exposed thermal spreader 158 (e.g., graphene sheet or other material) may be protected using a cover made out of leather, plastic, cloth, or other flexible material with insulating properties.

By using the thermal spreader 158 that spans both housings 102, 104, the temperature difference between the two housings of the computing device 100 may be reduced to less than a pre-determined threshold (e.g., preferably less than 6 degrees Fahrenheit and more preferably less than 4 degrees Fahrenheit). For example, the temperature difference between the two sides of the computing device 100 may be reduced to a level that does not cause users to become sufficiently concerned to call customer service. Furthermore, the thermal spreader 158 may distribute the thermal load across both housings 102, 104, approximately doubling the surface area available for thermal dissipation. By increasing thermal dissipation using the thermal spreader 158, components that use more power may be used in the design of the computing device 100. The increased thermal dissipation may enable the computing device 100 to support computational components that consume more power (e.g., thereby generating more heat). For example, the thermal spreader 158 may enable the computing device 100 to support the CPU 112 with more cores and/or a faster clock speed, a more powerful (e.g., more pipelines, faster clock speed, or the like) GPU 114, more memory 116, a faster memory 116, or any combination thereof.

In FIG. 1, the first set of components of the computing device 100 shown as being located in the first housing 102 and the remaining set of components shown as located in the second housing 104 are purely for illustration purposes. Depending on the implementation, different components of the computing device 100 may be housed in one or both of the housings 102, 104. For example, when the computing device 100 is designed for graphics processing, the GPU 114 and supporting hardware (e.g., graphics support chips, graphics memory, and the like) may be housed in the second housing 104. As another example, in some cases, the ports 120 may be located in the first housing 102, in the second housing 104, or split between the two housings 102, 104. As a further example, the battery 154 may include multiple power cells, with a portion of the power cells located in the first housing 102 and zero or more of the power cells located in the second housing 104. In some cases, which components of the computing device 100 are located in each of the housings 102, 104 may be determined based on the thermal characteristics of the components. For example, the components may be distributed between the housings 102, 104 by grouping components that generate the most heat into the same housing, and using the thermal spreader 158 to cool that housing. In addition, while the computing device 100 is illustrated as having two display devices 108, 110, in some cases the computing device 100 may have a single display device, e.g., when the computing device 100 is configured as a tablet (e.g., all components in a single housing) or a laptop computing device (e.g., with a display in the first housing and input devices, such as a keyboard and touchpad, in the second housing).

Software instructions implementing an operating system and one or more applications, including at least one application capable of receiving stylus input, may be stored in the memory 116. The software instructions may be executed by the CPU 112, by the DSP processor 122, or any combination thereof.

Thus, a thermal spreader comprised of a single sheet may span a first housing, a second housing, and a gap between the two housings. The thermal spreader may have one or more layers of material, including thermally conductive material, such as graphene. A cover may be used to protect the portion of the thermal spreader that is exposed (e.g., across the gap between the two housings). The thermal spreader may attach to a vapor chamber that is coupled to heat generating components (e.g., CPU, GPU, memory, and the like) in a first housing. The thermal spreader may draw heat from the vapor chamber in the first housing and dissipate the heat in a second housing. The thermal spreader may use a flexible, thermally conductive material, such as graphene, to enable the first housing to flex and be placed at different angles relative to the second housing.

Figure 2:
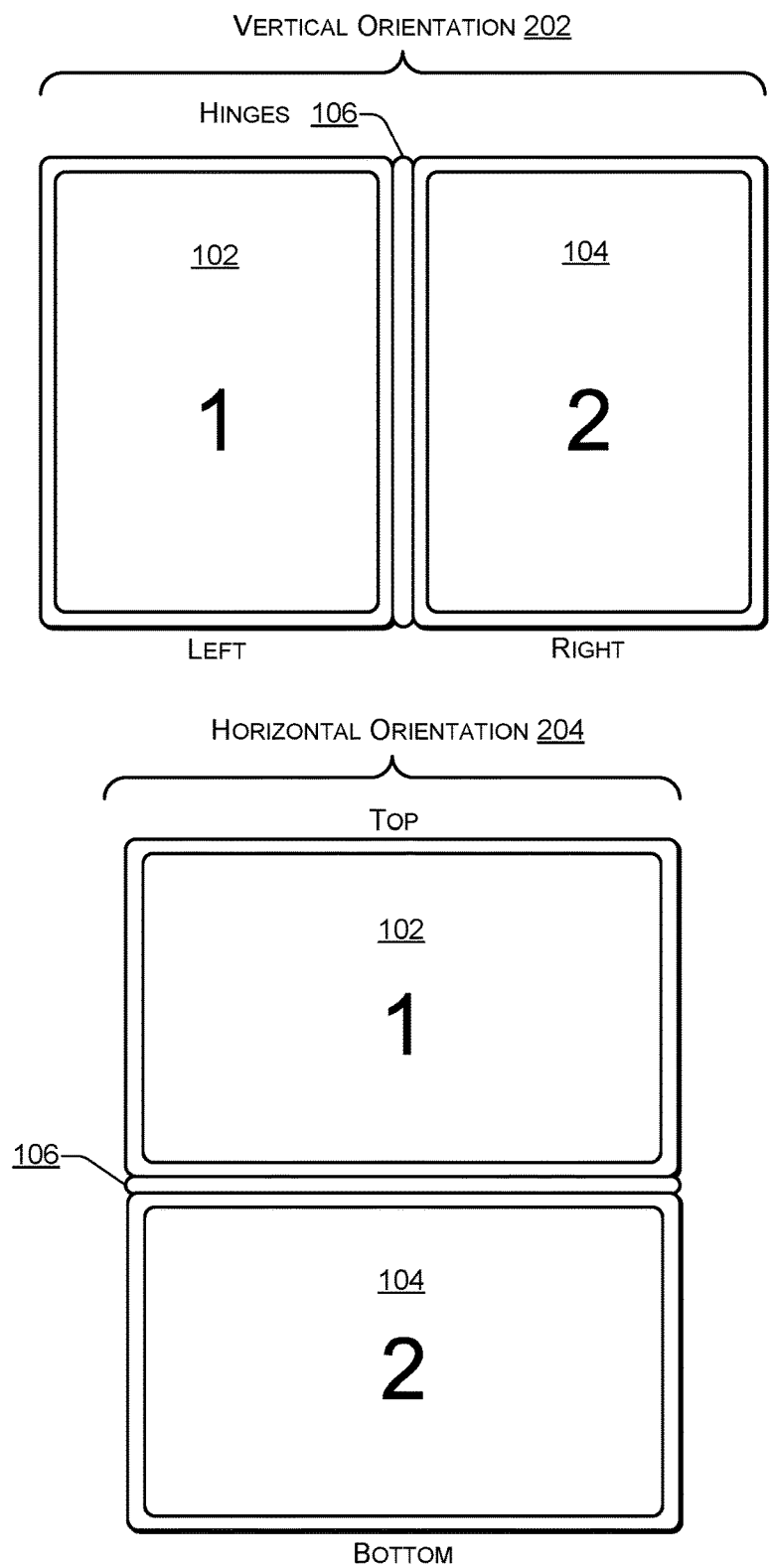
FIG. 2 is a block diagram illustrating different orientations of a dual-housing computing device according to some embodiments.

FIG. 2 is a block diagram illustrating different orientations of a dual-housing computing device (e.g., the computing device 100 of FIG. 1) according to some embodiments. The computing device 100 may include two housings 102, 104. One or both of the housings 102, 104 may include a display device. In some cases, one of the housings 102, 104 may include a display device and the other housing may include one or more input devices, such as a keyboard, trackpad, and the like.

The computing device 100 may be displayed in a vertical (e.g., portrait) orientation 202 or a horizontal (e.g., landscape) orientation 204. For example, in the vertical orientation 202, the first housing 102 may be on one side (e.g., the left side or the right side), the second housing 104 may be on another side (e.g., the right side or the left side), and the hinge 106 may join the first housing 102 to the second housing 104. Additional examples of the vertical orientation 202 are illustrated in FIG. 3. In the horizontal orientation 204, the first housing 102 may be located at the top (or the bottom) of the computing device 100 with the hinge 106 in the middle and the second housing 104 may be located at the bottom (or the top) of the computing device 100. Additional examples of the horizontal orientation 204 are illustrated in FIG. 4.

FIG. 3 is a block diagram illustrating different vertical orientations of a dual-housing computing device according to some embodiments. Additional examples of the vertical orientation 202 may include a book orientation 302 and a vertical tablet orientation 304. For example, in a first book orientation 302(1), the first housing 102 may be on the left and the second housing 104 may be on the right. Alternately, in a second book orientation 302(2), the second housing 104 may be on the left and the first housing 102 may be on the right.

In the vertical tablet orientation 304, the first housing 102 may be on the left and the second housing 104 may be on the right. In a first vertical tablet orientation 304(1), the first housing 102 may be facing a user and the second housing 104 may be rotated approximately 360 degrees to face away from the user. In a second vertical tablet orientation 304(2), the second housing 104 may be facing the user while the first housing 102 may rotated approximately 360 degrees to face away from the user.

Figure 4:
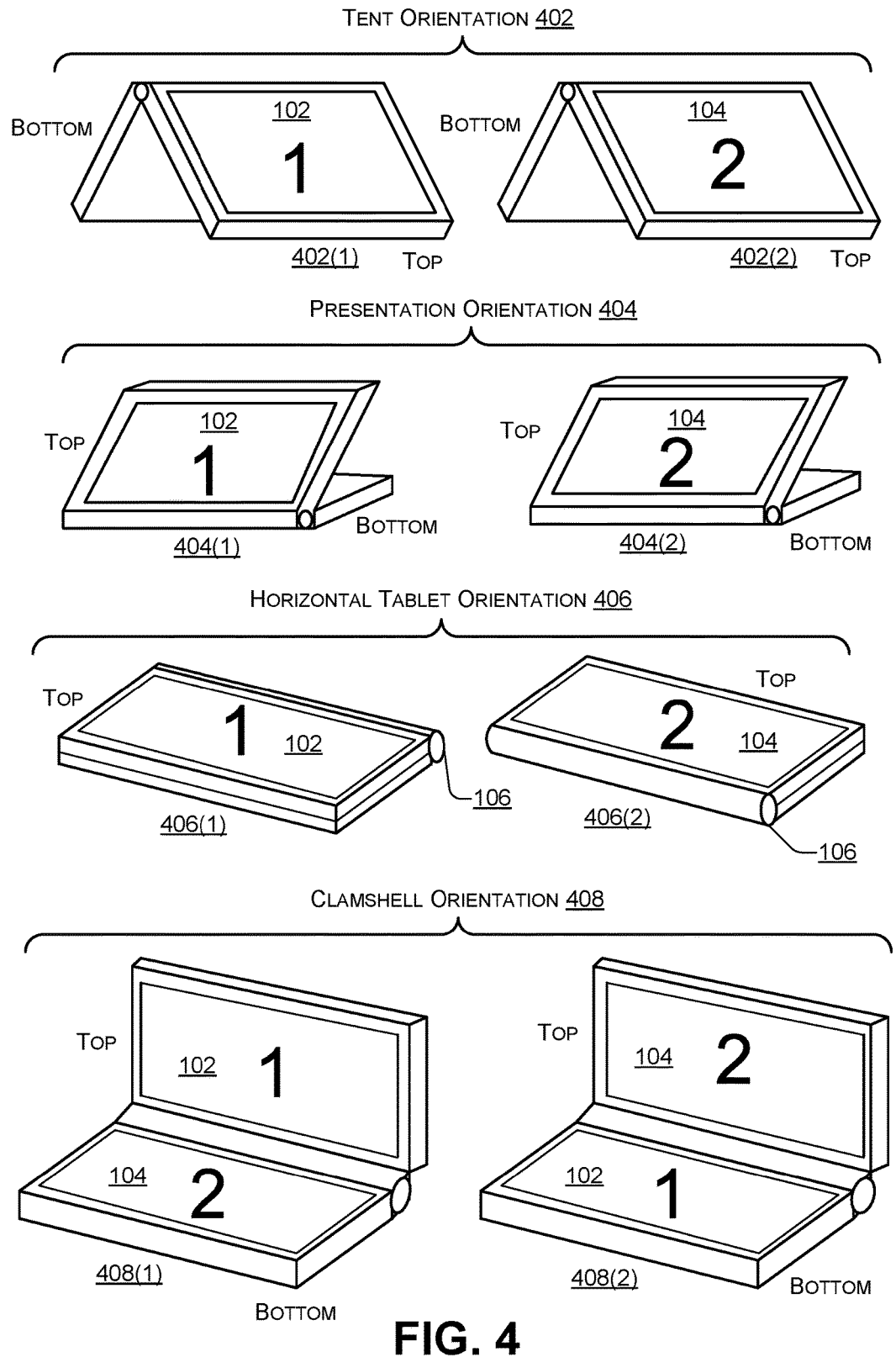
FIG. 4 is a block diagram illustrating different horizontal orientations of a dual-housing computing device according to some embodiments.

FIG. 4 is a block diagram illustrating different horizontal orientations of a dual-housing computing device according to some embodiments. Additional examples of the horizontal orientation 204 may include a tent orientation 402, a presentation orientation 404, a horizontal tablet orientation 406, and a clamshell orientation 408.

In 402(1), the first housing 102 may be at the top facing the user while the second housing 104 may be at the bottom facing away from the user. In 402(2), the second housing 104 may be at the top facing the user and the first housing 102 may be at the bottom facing away from the user.

In 404(1), the first housing 102 may be at the top facing the user and the second housing 104 may be at the bottom facing down. In 404(2) the second housing 104 may be at the top facing the user and the first housing 102 may be at the bottom facing down.

In 406(1), the first housing 102 may be at the top facing the user and the second housing 104 may be at the bottom facing down (e.g., away from the user). In 406(2), the second housing 104 may be at the top facing the user and the first housing 102 may be at the bottom facing down (e.g., away from the user).

In 408(1), the first housing 102 may be at the top facing the user and the second housing 104 may be at the bottom facing the user (e.g., in a position where traditionally, a keyboard is located in a laptop). In 408(1), in some cases, a QWERTY-based keyboard may be displayed on the second housing 104 and used to receive keyboard input. In 408(2), the second housing 104 may be at the top facing the user and the first housing 102 may be at the bottom facing the user (e.g., in a position where traditionally, a keyboard is located in a laptop). In 408(2), in some cases, a QWERTY-based keyboard may be displayed on the first housing 102 and used to receive keyboard input.

Figure 5:
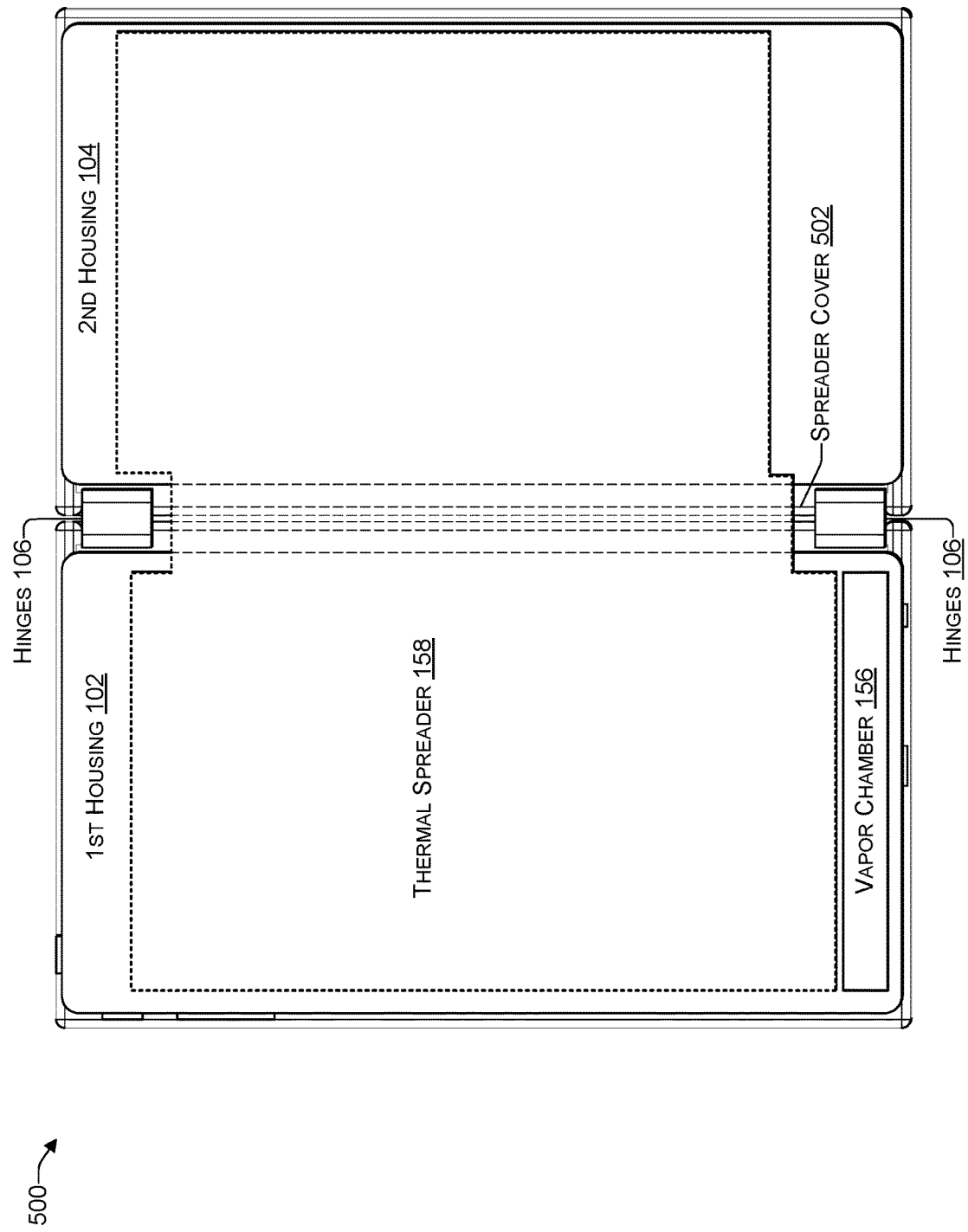
FIG. 5 is a block diagram illustrating a thermal spreader of a dual-housing computing device according to some embodiments.

FIG. 5 is a block diagram 500 illustrating a thermal spreader of a dual-housing computing device according to some embodiments. The thermal spreader 158 may be in contact with the vapor chamber 156 (or another type of heat sink used with one or more components housed in the first housing 102).

If the hinges 106 are fairly small (e.g., a sum of the length of all the hinges 106 is less than 50% of the length of the longest side of one of the housings 102, 104), then the thermal spreader 158 may be a single sheet spanning both housings 102, 104, as illustrated in FIG. 5. A small portion of the thermal spreader 158 that spans the two housings 102, 104 may be external to the computing device 100. A spreader cover 502 that is made from a flexible material, such as leather, plastic, cloth, or the like, that is capable of insulating heat may be used to protect the exposed portion of the thermal spreader.

If the hinges 106 are not small (e.g., a sum of the length of all the hinges 106 is greater than or equal to 50% of the length of the longest side of one of the housings 102, 104), then the thermal spreader 158 may be a single sheet spanning both housings 102, 104, and the portion of the thermal spreader 158 that spans the two housings 102, 104 may be threaded through openings (e.g., conduits) in the hinges 106. In this example, the spreader cover 502 may not be used.

Figure 6:
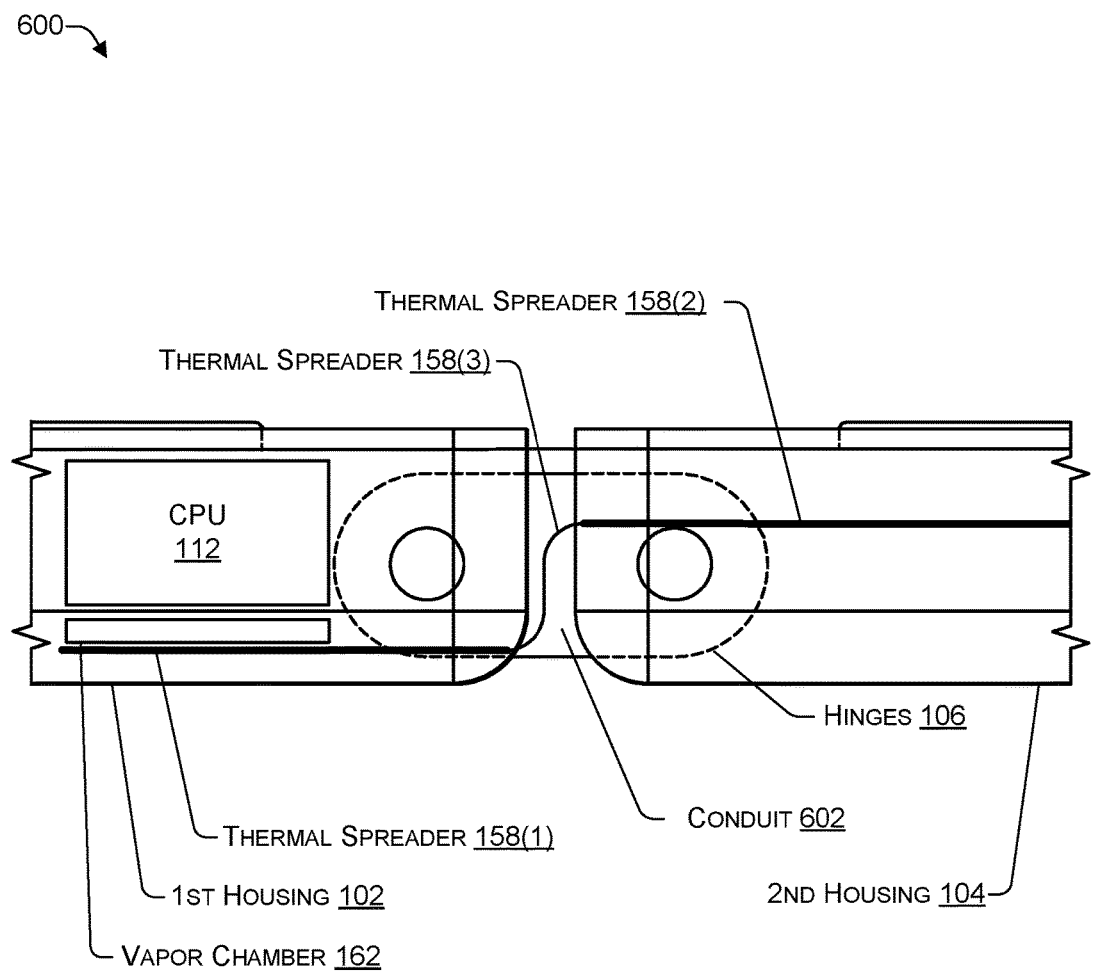
FIG. 6 is a block diagram illustrating a thermal spreader of a dual-housing computing device in an open position according to some embodiments.

FIG. 6 is a block diagram illustrating a thermal spreader of a dual-housing computing device in an open position 600 according to some embodiments. In the open position 600, the thermal spreader 158 may be viewed as having three portions, 158(1), 158(2), and 158(3). The first portion 158(1) may be located in the first housing 102 and the second portion 158(2) may be located in the second housing 104. The first portion 158(1) may be in contact with the vapor chamber 162 (or another type of heatsink) used to dissipate heat from heat generating components, such as the CPU 112.

If the hinges 106 are fairly small, the portion 158(3) that spans the two housings 102, 104 may be external to the computing device 100. If the hinges 106 are not small, then the portion 158(3) that spans the two housings 102, 104 may be threaded through at least one conduit 602 in the hinges 106. In some cases, the conduit 602 may include a cooling structure, such as a tube with cooling fins. For example, the conduit 602 may include cooling fins that are (1) internal to the tube, (2) external to the tube, or (3) both. To increase the amount of cooling, the conduit 602 may include one or more openings, e.g., a length-wise opening, an opening at either (or both) end, or both. In some cases, one or more air filters may be used in the openings (e.g., length-wise opening, opening on either or both ends, or both) of the conduit 602 to prevent dirt, dust, or other particles from entering into the hinges 106. In some cases, the third portion 158(3) of the thermal spreader may be incorporated into the hinges 106 while the first portion 158(1) and the second portion 158(2) are embedded into the first housing 102 and the second housing 104, respectively.

The portions, 158(1), 158(2), and 158(3) may be created using one or more layers of material (e.g., graphene, graphite, copper, aluminum, or the like). In some cases, the portions 158(1) and 158(2) may be thicker and/or have more layers as compared to the portion 158(3) because the portion 158(3) may flex (e.g., bend between at least about 0 degrees to about 360 degrees) while the portions 158(1), 158(2) may not flex. The portion 158(3) may use a flexible thermal conductor, such as graphene, while the portions 158(1), 158(2) may use a less flexible thermal conductor (e.g., aluminum or other metal). In some cases, the portions 158(1) and 158(2) may have two more layers (e.g., graphene and aluminum) of material while the portion 158(3) may have a single layer of material (e.g., graphene). Because the portion 158(3) is fairly small compared to the portions 158(1), 158(2), the flexibility of the portion 158(3) is more important than its thermal dissipation characteristics. By using multiple layers of material for the portions 158(1), 158(2), e.g., the larger portions, the heat dissipation characteristics of the portions 158(1), 158(2) can be increased even if the multiple layers cause the portions 158(1), 158(2) to be less flexible than the portion 158(3).

Figure 7:
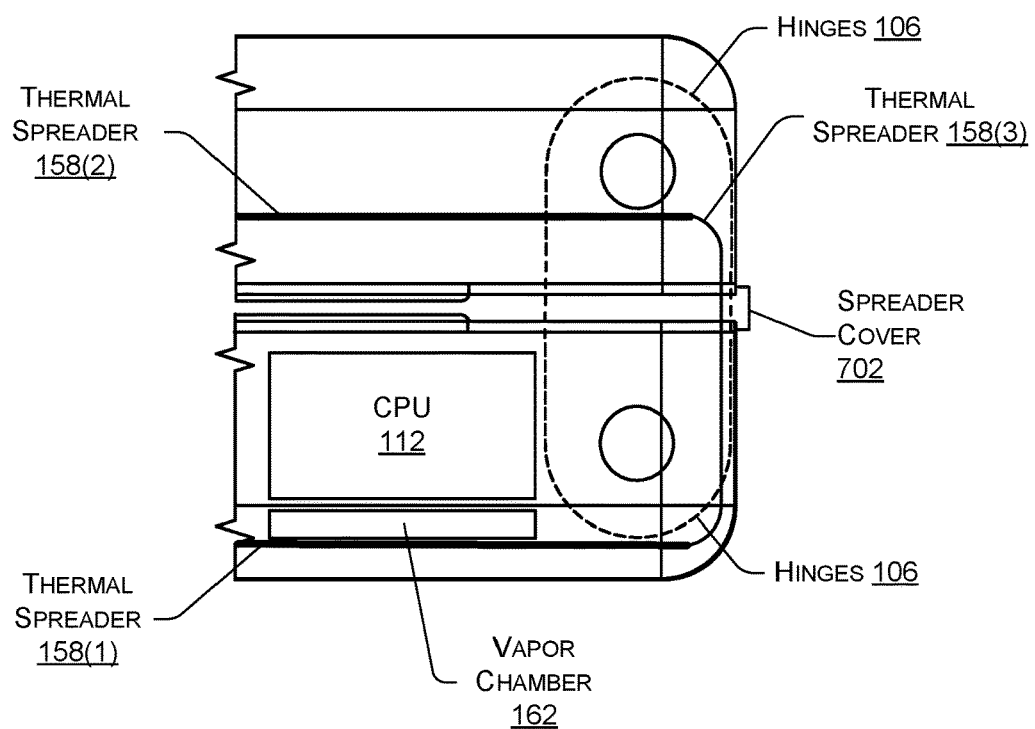
FIG. 7 is a block diagram illustrating a thermal spreader of a dual-housing computing device in a closed position according to some embodiments.

FIG. 7 is a block diagram illustrating a thermal spreader of a dual-housing computing device in a closed position 700 according to some embodiments. In the closed position 700, the first portion 158(1) may be located in the first housing 102 and the second portion 158(2) may be located in the second housing 104. The first portion 158(1) may be in contact with the vapor chamber 162 (or another type of heatsink) used to dissipate heat from heat generating components, such as the CPU 112.

If the hinges 106 are fairly small, the portion 158(3) that spans the two housings 102, 104 may be external to the computing device 100. The cover 702, made of a flexible thermal insulator, such as cloth, leather, plastic, or the like may be used over an exposed area of the portion 158(3) to protect the exposed area. If the hinges 106 are not small, then the portion 158(3) that spans the two housings 102, 104 may be threaded through a conduit or other opening in the hinges 106. In some cases, the portion 158(3) of the thermal spreader may be integrated into the hinges 106, and the spreader cover 702 may not be used. For example, the hinges 106 may include one or more layers, including a graphene layer that is connected to the portions 158(1), 158(2) of the thermal spreader, and an external layer to protect the graphene layer (e.g., instead of a cover).

Figure 8:
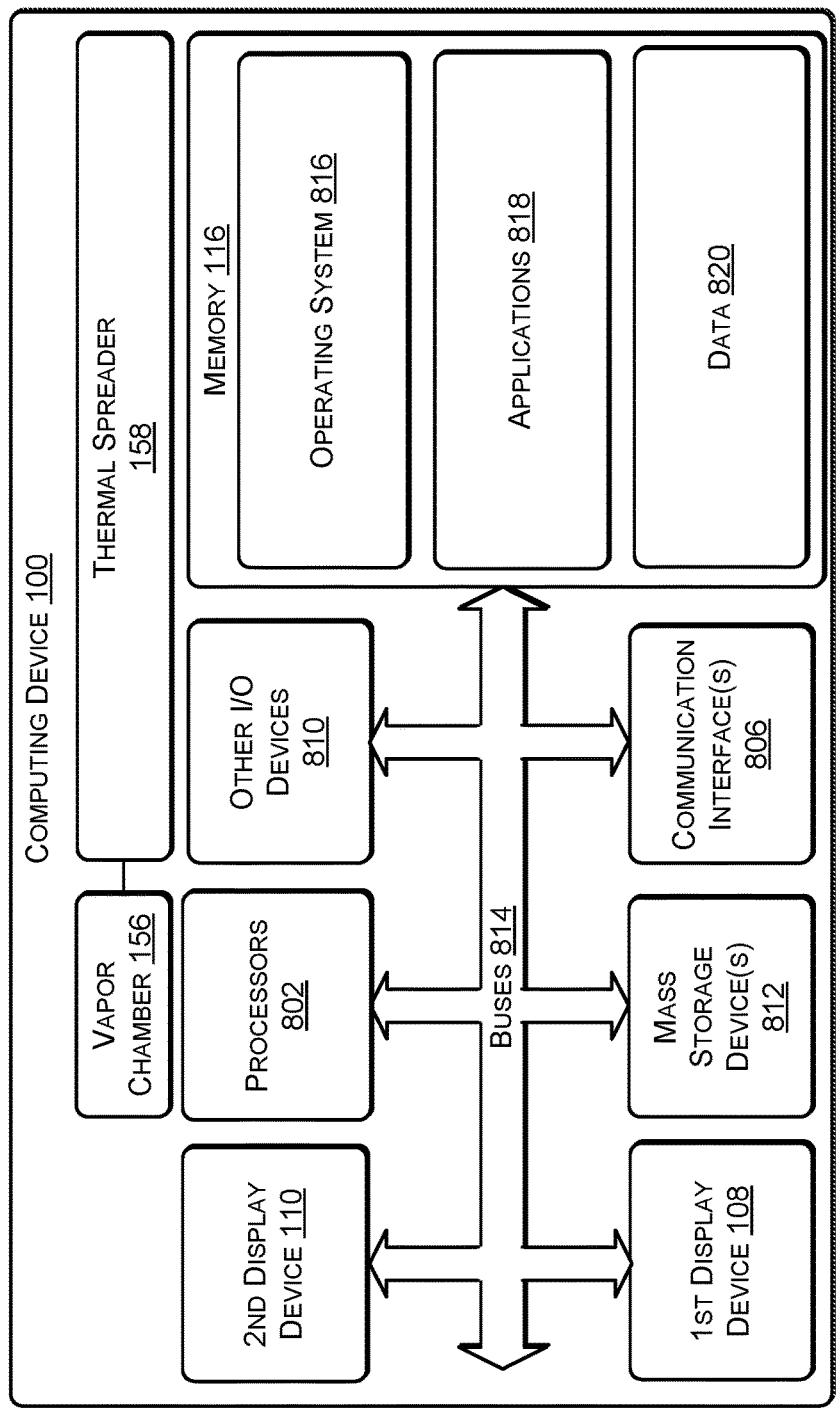
FIG. 8 illustrates an example configuration of a computing device that can be used to implement the systems and techniques described herein.

FIG. 8 illustrates an example configuration of the computing device 100 of FIG. 1 that can be used to implement the systems and techniques described herein. The computing device 100 may include one or more processors 802 (e.g., the CPU 112 and the GPU 114 of FIG. 1), the memory 116, communication interfaces 806 (e.g., including the I/O ports 120), the display devices 108, 110, other input/output (I/O) devices 810 (e.g., keyboard, trackball, and the like, such as the additional components 144), and one or more mass storage devices 812 (e.g., including the memory 116), configured to communicate with each other, such as via one or more system buses 814 (e.g., including the data bus 128, 130) or other suitable connections. While a single system bus is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include the GPU 114 integrated into the CPU 112 or the GPU 114 may be a separate processor device from the CPU 112. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 116, mass storage devices 812, or other computer-readable media.

Memory 116 and mass storage devices 812 are examples of computer storage media (e.g., memory storage devices) for storing instructions that can be executed by the processors 802 to perform the various functions described herein. For example, memory 116 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 812 may be collectively referred to as memory or computer storage media herein, and may be any type of non-transitory media capable of storing computer-readable, processor-executable program instructions as computer program code that can be executed by the processors 802 as a particular machine configured for carrying out the operations and functions described in the implementations herein.

The computing device 100 may also include one or more communication interfaces 806 for exchanging data via a network. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, the cloud storage 232, or the like.

The display devices 108, 110 may be located in the housings 102, 104, respectively, and may be are connected using one or more hinges (e.g., the hinges 106 of FIG. 1). The hinges may enable each display device to be placed at an angle relative to the other display device. For example, the display devices 108, 110 may be used for displaying information and images to users. Other I/O devices 810 may be devices that receive various inputs from a user and provide various outputs to the user, and may include a keyboard, a touchpad, a mouse, a printer, audio input/output devices, and so forth.

The computer storage media, such as memory 116 and mass storage devices 812, may be used to store software and data. For example, the computer storage media may be used to store an operating system 816 of the computing device 100 and software applications 818. The memory 116 may also be used to store data 820.

One or more of the computing components, such as the CPU 112, the GPU 114, or the memory 116, may be in contact with a heat sink, such as the vapor chamber 156. The vapor chamber 156 may be located in whichever housing is used to house components that generate the most amount of heat. For example, the vapor chamber 156 may be housed in the same housing as the CPU 112.

The thermal spreader 158 may be in contact with the vapor chamber 156. The thermal spreader 158 may conduct heat from heat generating components (e.g., CPU 112, GPU 114, or memory 116), via contact with the vapor chamber 156, to a second housing, where the heat is more easily dissipated because components in the second housing may generate less heat than the primary heat generating components (e.g. the housing that includes the CPU 112). Thus, the thermal spreader 158 may span both the first housing and the second housing and may draw heat from components in one housing and dissipate the heat in another housing.

The thermal spreader 158 may include one or more layers of thermally conductive materials, such as graphite, copper, aluminum, another type of material, or any combination thereof. The thermal spreader 158 may use at least 3 portions, e.g., a first portion in the first housing, a second portion in the second housing, and a third portion that thermally connects the first portion to the second portion. The third portion of the thermal spreader 158 may be sufficient flexible to enable the first housing to be placed at an angle (e.g., preferably between about 0 to about 180 degrees or between about 0 to about 360 degrees) relative to the second housing. The third portion of the thermal spreader 158 may be capable of thermally conducting heat from the warmer housing to the cooler housing while enabling the first housing to be placed at different angles relative to the second housing. In addition, the third portion of the thermal spreader 158 may be designed to be repeatedly flexed (e.g., articulated) without breaking (or other damage) for an expected life of the computing device 100. In some cases, the third portion of the thermal spreader 158 may be placed inside the one or more hinges. The thermal spreader 158 may be made of a flexible material, such as graphene, enabling a single graphene sheet to be used for both housings.

In some cases, when the hinges are fairly long, the thermal spreader 158 may be threaded through conduits in the hinges. In other cases, when the hinges are fairly small, a portion of the thermal spreader 158 may protrude outside the housings. In such cases, the exposed thermal spreader 158 (e.g., graphene sheet or other material) may be protected using a cover made out of leather, plastic, cloth, or other flexible material with insulating properties.

By using the thermal spreader 158 that spans both housings, the temperature difference between the two housings of the computing device 100 may be reduced to less than a pre-determined threshold (e.g., preferably less than 6 degrees Fahrenheit and more preferably less than 4 degrees Fahrenheit). For example, the temperature difference between the two sides of the computing device 100 may be reduced to a level that does not cause users to become sufficiently concerned to call customer service. Furthermore, the thermal spreader 158 may distribute the thermal load across both housings, approximately doubling the surface area available for thermal dissipation. By increasing thermal dissipation using the thermal spreader 158, components that use more power may be used in the design of the computing device 100. The increased thermal dissipation may enable the computing device 100 to support computational components that consume more power (e.g., thereby generating more heat). For example, the thermal spreader 158 may enable the computing device 100 to support the CPU 112 with more cores and/or a faster clock speed, a more powerful (e.g., more pipelines, faster clock speed, or the like) GPU 114, more memory 116, a faster memory 116, or any combination thereof.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   a first housing comprising:
      a first set of components; and
      a vapor chamber in contact with at least one component of the first set of components;
   a second housing comprising:
      a second set of components;
   one or more hinges coupling the first housing to the second housing; and
   a thermal spreader comprising a graphene sheet, wherein:
      a first portion of the graphene sheet is located in the first housing; and
      a second portion of the graphene sheet is located in the second housing; and
   wherein:
      the first portion of the graphene sheet is in contact with the vapor chamber;
      the first portion of the graphene sheet is thermally coupled to the second portion of the graphene sheet; and
      the second portion of the graphene sheet dissipates at least some heat gathered by the first portion of the graphene sheet from the contact with the vapor chamber.

2. The computing device of claim 1, wherein:
   the one or more hinges include a conduit through which the graphene sheet passes.

3. The computing device of claim 1, wherein:
   the thermal spreader further comprises a metal layer.

4. The computing device of claim 1, wherein:
   the first housing further comprises a first display device; and
   the second housing further comprises a second display device.

5. The computing device of claim 1, wherein:
   the first housing further comprises a QWERTY-based keyboard; and
   the second housing further comprises a display device.

6. The computing device of claim 1, wherein at least one of the first portion of the graphene sheet or the second portion of the graphene sheet includes a metal layer.

7. The computing device of claim 1, wherein the thermal spreader further comprises:
   a third portion of the graphene sheet thermally couples the first portion of the graphene sheet to the second portion of the graphene sheet.

8. A computing device comprising:
   a first housing comprising:
      a first display device;
      a first set of components; and
      a vapor chamber in contact with at least a first component of the first set of components;
   a second housing comprising:
      a second display device;
      a second set of components;
   one or more hinges coupling the first housing to the second housing; and
   a thermal spreader comprising a graphene sheet, wherein:
      a first portion of the graphene sheet is located in the first housing; and
      a second portion of the graphene sheet is located in the second housing; and
   wherein:
      the first portion of the graphene sheet is thermally coupled to (1) the vapor chamber and to (2) the second portion of the graphene sheet; and
      the first portion of the graphene sheet gathers heat from the vapor chamber and transfers at least some of the heat from the first portion of the graphene sheet to the second portion of the graphene sheet for dissipation.

9. The computing device of claim 8, wherein:
   the one or more hinges include a conduit through which the graphene sheet passes.

10. The computing device of claim 8, wherein:
    the one or more hinges enable the first housing to be placed at an angle of between about 0 degrees to at least about 180 degrees relative to the second housing.

11. The computing device of claim 8, wherein at least one of the first portion of the graphene sheet or the second portion of the graphene sheet includes a metal alloy layer.

12. The computing device of claim 11, wherein the metal alloy layer includes at least one of a copper alloy layer or an aluminum alloy layer.

13. The computing device of claim 8, wherein the thermal spreader further comprises:

a third portion to thermally couple the first portion to the second portion, wherein the third portion is protected by a cover made from at least one of cloth, leather, or plastic.

14. A computing device comprising:
a first housing comprising:
   a first set of components including an input device; and
   a vapor chamber in contact with at least one component of the first set of components;
a second housing comprising:
   a second set of components;
one or more hinges to couple the first housing to the second housing; and
a thermal spreader comprising a graphene sheet, wherein:
   a first portion of the graphene sheet is located in the first housing; and
   a second portion of the graphene sheet is located in the second housing;
wherein:
   the first portion of the graphene sheet gathers heat generated by the at least one component based on contact between the first portion of the graphene sheet and the vapor chamber;
   the first portion of the graphene sheet is thermally coupled to the second portion of the graphene sheet to transfer the heat from the first portion of the graphene sheet to the second portion of the graphene sheet; and
   the second portion of the graphene sheet dissipates at least some of the heat.

15. The computing device of claim 14, wherein:
the first housing further comprises a first display device; and
the second housing further comprises a second display device.

16. The computing device of claim 14, wherein:
the first housing further comprises a QWERTY-based keyboard; and
the second housing further comprises a display device.

17. The computing device of claim 14, wherein the first set of components further comprise:
a graphics processing unit (GPU);
at least one central processing unit (CPU);
one or more non-transitory computer-readable storage media; and
one or more input/output (I/O) ports.

18. The computing device of claim 14, wherein:
the one or more hinges enable the first housing to be placed at an angle of between about 0 degrees to about 360 degrees relative to the second housing.

19. The computing device of claim 14, wherein the thermal spreader further comprises:
a third portion to thermally couple the first portion to the second portion, wherein the third portion is routed through a conduit in the one or more hinges.

20. The computing device of claim 14, wherein the thermal spreader further comprises a metal alloy layer.

* * * * *